United States Patent [19]

Hanami et al.

[11] 3,890,226

[45] June 17, 1975

[54] METHOD OF TREATING ALUMINUM-CONTAINING WASTE WATER

[75] Inventors: Yuiti Hanami; Yoji Fukuyama, both of Yokohama, Japan

[73] Assignee: Kurita Water Industries Ltd., Osaka, Japan

[22] Filed: Mar. 11, 1974

[21] Appl. No.: 450,064

[52] U.S. Cl. ............... 210/44; 210/47; 210/66; 423/127; 423/629
[51] Int. Cl. ............................................. C02b 1/20
[58] Field of Search ............ 210/42, 44, 45, 46, 47, 210/49, 65–67; 423/127, 122, 629; 23/273 R; 156/23, 22, 19

[56] References Cited
UNITED STATES PATENTS 3,642,618  2/1972  Silva .................................. 210/44
3,694,356  9/1972  Vander Horst ...................... 210/47
3,798,160  3/1974  Huffman ............................. 210/53

OTHER PUBLICATIONS

Skoog, D. A. et al., "Fundamentals of Analytical Chemistry," Holt, Rinehart and Winston Inc., (1963), pp. 172–174.

Primary Examiner—Thomas G. Wyse
Assistant Examiner—Benoit Castel
Attorney, Agent, or Firm—Woodhams, Blanchard and Flynn

[57] ABSTRACT

A method of treating aluminum-containing waste water by neutralizing aluminum-containing alkaline waste water with acid water, wherein the neutralization reaction is carried out by adding the acid water to said waste water slowly after an aluminum hydroxide resultant from the progress of neutralization begins to precipitate.

9 Claims, No Drawings

METHOD OF TREATING ALUMINUM-CONTAINING WASTE WATER

BACKGROUND OF THE INVENTION a. Field of the Invention

The present invention relates to a method for treating strongly alkaline and strongly acidic waste waters from aluminum manufacturing factories in which the surface treatment of aluminum and alloys thereof is performed.

b. Description of the Prior Art

In factories for treating the surfaces of objects of aluminum and alloys thereof, a machine-ground metal plate is generally treated by means of a degreasing step, an alkali etching step, a surface neutralizing step, an anodic oxidation step and a final rinsing step. Between each of the above steps there is provided a rinsing step. In the waste waters from the respective rinsing steps and the final rinsing step the concentration of aluminum dissolved therein is low (0.05 to 0.1 g/l as Al) and the pH of said waste waters ranges from about 4 to 8. These waste waters are called general waste water and they can be discharged out of or reused in the factories after simple treatment, for instance, neutralizing the waste water by injecting chemicals thereinto. On the other hand, the waste water from the etching step (which will hereinafter be called alkali waste water) has a high alkali concentration and generally contains NaOH in an amount of 40 to 100 g/l, and aluminum is ordinarily dissolved therein at a concentration of 10 to 80 g/l. Further, the waste electrolyte from the anodic oxidation step (which will hereinafter be called acid waste water) is strongly acidic, the $H_2SO_4$ concentration thereof is in the range of from 100 to 175 g/l and aluminum is also dissolved therein in an amount of from 10 to 20 g/l. These alkali and acid waste waters have ordinarily been treated by mixing them with each other for neutralizing purposes and the thus-treated waters have been discharged out of the factories after separating the aluminum sludge resulting from the neutralization.

The aluminum sludge resulting from the neutralization treatment has been subjected to a dehydrating treatment by using a rotary screen and a roll-press type dehydrating machine, and then it has been disposed of in various manners, such as by burying the dehydrated cakes under the ground.

As described above, among the various waste waters from aluminum surface treating factories the alkali and acid waste waters contain valuable aluminum therein at a high concentration. Thus, the conventional methods wherein these waste waters are only mixed and neutralized, have failed to economically recover aluminum from the waste waters. This is because the aluminum hydroxide resulting from the sodium aluminate contained in the alkali waste water and the aluminum sulfate contained in the acid waste water, as a result of the neutralizing treatment, is generally in a gel state and is difficult to dehydrate, whereby it is extremely difficult to maintain a concentration of solid matters of more than 15% even if a coagulant is added to the sludge and then subjecting the same to centrifugal separation.

As a way to solve the above mentioned problems, it is possible to obtain an aluminum sludge excellent in dehydratability by gradually adding the aluminum-containing acid waste water to the aluminum-containing alkali waste water and thus prolong the neutralization time. However, in this way the aluminum-containing alkali waste water generally possesses a sodium hydroxide concentration of about 4 to 10 percent and still has a capacity for dissolving a considerable amount of aluminum therein, and consequently it takes a considerably long period of neutralization time until the aluminum hydroxide begins to precipitate and crystallize. Especially when the concentration of aluminum in the waste water is low, the aluminum hydroxide precipitates at a low pH and thereby it takes a long period of time to precipitate the aforesaid aluminum hydroxide. As the result of a series of investigations to improve the above mentioned procedure it has been found that the neutralization time (acid waste water adding time) after precipitation of aluminum hydroxide is the most important factor effecting the dehydratability of the produced aluminum hydroxide sludge. The present invention has been achieved based on this finding.

SUMMARY OF THE INVENTION

The present invention aims to obtain dischargeable treated waters and also to recover aluminum hydroxide sludge having a moisture content of less than 60 percent, especially less than 50 percent, by subjecting various kinds of waste waters from the aluminum surface treating process of aluminum manufacturing factories to the neutralization treatment as described hereinafter.

In particular, the present invention aims to recover Al sludge having a low moisture content from the alkali and acid waste waters which are high in Al concentration, and also to recover Al from the general waste water (rinsing waste water) which is low in Al concentration.

The present invention relates to a method of treating aluminum-containing waste waters by adding acid waste water to the aluminum-containing alkali waste water to neutralize those waste waters, which is characterized by carrying out the neutralization reaction by adding said acid water slowly after the aluminum hydroxide resulting from the progress of neutralization begins to precipitate.

DESCRIPTION OF THE PREFERRED EMBODIMENTS

The method according to the present invention is suitable for treating various kinds of waste waters from the processes of surface treating aluminum and alloys thereof. Generally speaking, the alkali waste water from the surface treating process contains 40 to 100 g/l of NaOH and 10 to 80 g/l of Al, and the acid waste water contains 100 to 175 g/l of $H_2SO_4$ and 10 to 20 g/l of Al, and the general waste water contains 0.05 to 0.1 g/l of Al, respectively, in a dissolved state.

According to the present invention the aluminum-containing alkali waste water is admixed with the aluminum-containing acid waste water so that the mixed water may have a dischargeable pH (5.8 to 8.5) as a result of neutralization. If the alkaline and acidic waste waters from factories are finally within the above-mentioned pH range as a result of mutual mixing there will be no necessity of adding other chemicals, but if the mixture obtained by the alkali-acid neutralization is not within that pH range it will be necessary to add supplemental alkali or acid chemicals to the waste waters. As alkali chemicals, for instance, there can be used NaOH and KOH, and as acid chemicals H$_2$SO$_4$, HCl etc. In this neutralization treatment, since the addition of the acidic waste water to the alkaline water is continued while stirring, the pH of the waste water is continuously reduced, and eventually precipitates of aluminum hydroxide form extensively in the water. Up to this time the addition of the acid waste water is effected rapidly in a short time. The remaining acid waste water is successively added slowly over a period of a 1 hour or more after the aluminum hydroxide begins to precipitate. Particularly, when the time of adding the acid waste water extends about 2 hours or more after the outbreak of precipitates, the separated aluminum hydroxide sludge is conspicuously improved in respect of its dehydratability and sedimentability. This is because prolongation of the completion of the neutralization time after the outbreak of precipitates causes the aluminum hydroxide to form needle-like or granular crystals, which are precisely distinguished from gel-precipitates obtained by the conventional neutralization processes. The time period of adding waste water prior to the outbreak of precipitates does not exert so much of an influence upon the dehydratability of aluminum hydroxide sludge as does the time period of adding the remaining acid waste water after the outbreak of precipitates. Therefore, until aluminum hydroxide begins to precipitate, it is preferable that the addition of acid waste water should be done at a speed such that the localized precipitation of aluminum hydroxide may be avoided or, if it is instantaneously precipitated, it is at once redissolved. Specifically, if the amount of the acid waste water to be added until the outbreak of precipitates occurs, is added over a period of 15 minutes or more preferably 20 minutes or more the localized precipitation of aluminum hydroxide can be prevented. However, prolongation of this first stage of the adding time more than necessary, does not improve the dehydratability of aluminum hydroxide, and therefore this first stage of the adding time is sufficient to be about 15 to 40 minutes. Stirring should be effected at that time and the stirring velocity (peripheral speed) should be maintained at more than 1m/sec., preferably in the range of from 3 to 5 m/sec.

If localized precipitation of aluminum hydroxide takes place, the dehydratability of aluminum sludge is lowered. But, if the lowered dehydratability is such that it is acceptable the occurrence of a little precipitation can be neglected.

When aluminum hydroxide begins to precipitate, the water becomes extensively white-turbid, and so the outbreak point of precipitation can easily be observed with the naked eye. This phenomenon is caused by the fact that the aluminum hydroxide resulting from the progress of neutralization reaches a super-saturated condition and it at once begins to precipitate. After this time, the remaining acid waste water is slowly added during the second stage of adding, but this time is not always critical and the beginning of the second stage may be set to occur just before the water becomes white-turbid. Furthermore, by pre-examination of the waste water to be treated, the pH at the outbreak point of precipitation can be foreseen, and therefore in practical treatment, the outbreak of the aluminum hydroxide precipitates may be detected by measuring the pH. The precipitation of aluminum hydroxide generally begins at a pH range of from 12.5 to 13. Still further, the actual amount of the acid waste water to be added before the outbreak of precipitation can be established in advance by treating a sample the waste water beforehand in a beaker-test to measure the amount of acid required before the outbreak of precipitation and the amount of acid required thereafter to complete neutralization and then the ratio therebetween is applied to the original waste water amount. Thus a calculated amount of the acid waste water is added to the alkali waste water over a short time, for instance for about 20 minutes. And the remainder of the acid waste water is added over a long time, for instance for about 2 hours and then neutralization is completed.

This neutralization treatment should preferably be effected at a temperature more than 40°C, and the higher the temperature is, the more excellent dehydratability of sludge is obtainable. As this neutralization reaction is an exothermic one, when using a neutralization tank equipped with a heat-retaining means, heating has only to be made at the initial stage of the reaction and the heat of neutralization produced by the advance of the reaction thereby holds the liquid at a predetermined temperature. The thus-obtained neutralization-treated water is stored in a storage tank, and then is fed to a centrifugal filter. The clear water separated from the aluminum sludge by operation of the centrifugal filter, the pH thereof being neutral, can be discharged out of the factory. But, if some solid matter also remains in the said clear water it is preferred to subject same to coagulation treatment before discharging same. The coagulation treatment may be effected in an coagulation treatment tank installed in the general waste water treating system. The aluminum sludge recovered by centrifugal separation has a moisture content of 60 percent or less and under preferable conditions 50 percent or less, and the aluminum hydroxide products are crystalline.

The neutralized water may also be subjected to a settling treatment prior to the dehydration treatment using the centrifugal separation. As the aluminum hydroxide produced according to the method of the present invention is possessed of an excellent sedimentability, the greater part of the supernatant liquid can be separated from the sludge.

In order to obtain, aluminum hydroxide sludge having a superior dehydratability, it is preferable that each of the alkali and acid waste waters contains 10 g/l or more of aluminum in a dissolved state, particularly in the case of the alkali waste water the dissolved aluminum concentration is preferably 30 g/l or more because such conditions permit obtainment of a highly dehydratable sludge.

On the other hand, the general waste water from aluminum surface treating factory is preferred to be treated as described hereinafter.

The pH of general waste water is in the range of from 4 to 8, and so the pH may be adjusted to be in the range from 6 to 7 firstly by neutralizing it with an acid such as sulfuric acid or hydrochloric acid, or an alkali such as sodium hydroxide or potassium hydroxide. As a result of this neutralization there is caused precipitation of aluminum hydroxide in the form of fine particles. The fine particles, however, are inferior in sedimentability. The general waste water then undergoes coagulation treatment by adding thereto a high molecular organic coagulant. As to the high molecular coagulant, for instance, there is usable a nonionic or anionic water soluble high molecular polymer such as polyacrylamide, partial hydrolyzate of polyacrylamide, polyacrylic acid etc. The coagulant may be added in amounts within the range of from 0.5 to 10 ppm.

Next, the water after coagulation treatment is subjected to solid-liquid separation. As a solid-liquid separation method, the dissolved air flotation method is suitable wherein pressurized water containing dissolved air is introduced to the coagulated water under atmospheric pressure to thereby generate fine air bubbles and the solids suspended in the water rise to the surface of the water together with the flotation of the air bubbles and the solids are collected. By using this dissolved air flotation method aluminum hydroxide is concentrated into scums on the surface of the water. The water thus becomes clear and dischargeable. On the other hand, the scum contains about 1 to 3% of Al therein. Then the scum is dissolved in the aforesaid alkali waste water and acid waste water and then is fed to the abovedescribed aluminum-recovering process. The scum may be dissolved in either of alkali or acid waste water, or in both waste waters. In view of the acid waste water being higher in Al-dissolving capacity than the alkali waste water, it is preferable to dissolve the scum in the acid waste water. After the scum has thus been dissolved in the waste water said waste water is treated by the aforesaid neutralizing method, thereby making possible the recovery of the Al content from the general waste water.

As described above, by fixing only the neutralization conditions, the present invention makes it possible to treat various kinds of waste waters from aluminum manufacturing factories, in particular to recover crystals of aluminum hydroxide with low moisture content.

The thus-recovered aluminum hydroxide, as compared with the gel - aluminum hydroxide obtained by the conventional methods, is extremely low in moisture content, small in volume and improved in flakiness, and thereby is capable of being packed in a bag and the like and it is easy to transport. And, this recovered Al can be reused as a material for making ceramic products such as refractories etc., a material for manufacturing alumina, a material for manufacturing activated alumina, a material for aluminum sulfate or as a coagulant per se.

EXAMPLE 1

150 ml of artificial alkali waste water having an Al concentration of 10 g/l and an NaOH concentration of 100 g/l, was placed in a reaction tank equipped with an external heating apparatus, and was heated to 60°C. In order to neutralize the alkali waste water by adding 128 ml of artificial acid waste water having an Al concentration of 10 g/l and an $H_2SO_4$ concentration of 150 g/l, the acid waste water was added speedily until the outbreak point of precipitates (the amount of added acid was 90 ml and the remaining the adding time was 30 minutes up to this time), and 38 ml of the acid waste water was added slowly over a period of 2 hours after the outbreak point. After the completion of neutralization the liquid in the tank was left to stand and is separated into the supernatant liquid and the sludge. The volume of the sludge after 30 minutes' standing time was 14 percent.

Next, the separated sludge was put in a centrifugal filter equipped with 90 mesh glass filter and was subjected to dehydration under the conditions of a rotation velocity of 3,000 r.p.m. and a dehydrating time of 10 minutes. The sludge after the centrifugal separation had 49.0 percent moisture content.

In the same procedure, by changing the neutralization time after the outbreak of aluminum hydroxide precipitates and also changing the reaction temperature there were obtained following results.

| Test No. | Neutralization time after outbreak of precipitate (hr.) | Reaction temperature (°C) | Sludge volume index after 30 minutes' standing | Sludge moisture content after dehydration (%) |
|---|---|---|---|---|
| 1 | 0.25 | 60 | 40 | 71 |
| 2 | 1.0 | 60 | 22 | 60 |
| 3 | 2.0 | 60 | 14 | 49 |
| 4 | 3.0 | 60 | 10 | 38 |
| 5 | 2.0 | 40 | 15 | 55 |

EXAMPLE 2

The general waste water (Al concentration 0.05 to 0.1 g/l, pH 3.5 to 6.8), alkali waste water (Al concentration 50 g/l, NaOH concentration 70 g/l, pH 13.5) and acid waste water (Al concentration 18 g/l, $H_2SO_4$ concentration 150 g/l, pH 0) from the surface treatment process of an aluminum surface treating factory were treated as follows.

Firstly, sodium hydroxide was added to the general waste water so that the pH ranged from 6.0 to 7.0 and neutralization was effected. 1 ppm of partial hydrolyzate of polyacrylamide was added to this neutralized liquid for coagulation treatment purposes. This treated water was introduced to the dissolved air flotation tank and then pressurized water containing dissolved air under pressure (3 kg/cm²) was supplied thereto under atmospheric pressure to effect flotation separation. Thus a floating scum was collected which scum contained 1.5 percent of aluminum hydroxide as Al. The pH of the supernatant liquid was 6.5 and the Al concentration thereof was less than 10 ppm.

The thus-obtained scum was next placed in the acid waste water and dissolved therein. The Al concentration and the amount of acid water at this time were 17.3 g/l and 560 l respectively.

On the other hand, 123 l of the alkali waste water was put into the reaction tank and then the acid waste water containing dissolved scum was added to aforesaid alkali waste water at the adding rate of 560 l/h over a period of 30 minutes so that the water turned white-turbid. Next, the remaining acid waste water was added thereto over a period of 2 hours and the neutralization completed. During addition of the acid waste water the reaction temperature was maintained at 70°C and stirring was effected at a stirring velocity (peripheral speed) of 4 m/sec.

This neutralized liquid was subjected to solid-liquid separation process by means of a vertical centrifugal filter (rotation velocity 3,000 r.p.m.). The thus-separated sludge was about 29 percent in moisture content.

X ray diffraction analysis of this sludge exhibited the peak of $\beta$-Al(OH)$_3$.

What is claimed is:

1. A method of treating aluminum-containing waste waters, consisting essentially of a. an alkaline waste water containing dissolved therein from 40 to 100 g/l of sodium hydroxide and from 10 to 80 g/l of aluminum, and
b. an acidic waste water containing dissolved therein from 100 to 175 g/l of sulfuric acid and from 10 to 20 g/l of aluminum, comprising the steps of: rapidly adding (b) to (a), with stirring, at a rate such that the pH of the mixed waste waters becomes in the range of from about 12.5 to about 13 and aluminum hydroxide begins to precipitate therein within a time of from about 15 to 40 minutes after the beginning of addition of (b), then continuing to add and stir (b) into the mixed waste waters, at a slower rate such that the pH of the mixed waste waters is reduced to in the range of from about 5.8 to about 8.5 over a period of at least one hour and thereby precipitating beta aluminum hydroxide in substantially needle-like or granular form, the temperature of the mixed waste waters being maintained at 40°C or more during the addition of (b), terminating the addition of (b) when the pH of the mixed waste waters reaches from about 5.8 to about 8.5, and then recovering the precipitated beta aluminum hydroxide containing less than 60 wt. % water from the mixed waste waters.

2. A method as claimed in claim 1, wherein the duration of the time period of said continuing addition of (b) to reduce the pH of the mixed waste waters to from 5.8 to 8.5 is at least two hours.

3. A method as claimed in claim 1, in which the step of recovering the precipitated beta aluminum hydroxide comprises subjecting to centrifugal separation the mixed waste waters containing precipitated beta aluminum hydroxide to separate a cake containing the precipitated beta aluminum hydroxide, from the remainder of the water.

4. A method of treating aluminum-containing waste waters, consisting essentially of
a. an alkaline waste water containing dissolved therein from 40 to 100 g/l of sodium hydroxide and from 10 to 80 g/l of aluminum,
b. an acidic waste water containing dissolved therein from 100 to 175 g/l of sulfuric acid and from 10 to 20 g/l of aluminum, and
c. rinse waste water having a pH of about 4 to about 8 and containing from 0.05 to 0.1 g/l of dissolved aluminum, comprising the steps of: neutralizing (c) with an acid or alkali to a pH of from 6 to 7 to precipitate aluminum hydroxide, then adding to (c) from 0.5 to 10 ppm of a nonionic or anionic water soluble polymer-type coagulating agent to coagulate the aluminum hydroxide particles, separating a scum containing the coagulated aluminum hydroxide particles from the water, dissolving said scum in either of (a) or (b), rapidly adding (b) to (a), with stirring, at a rate such that the pH of the mixed waste waters becomes in the range of from about 12.5 to about 13 and aluminum hydroxide begins to precipitate therein within a time of from about 15 to 40 minutes after the beginning of addition of (b), then continuing to add and stir (b) into the mixed waste waters, at a slower rate such that the pH of the mixed waste waters is reduced to in the range of from about 5.8 to about 8.5 over a period of at least one hour and thereby precipitating beta aluminum hydroxide in substantially needle-like or granular form, the temperature of the mixed waste waters being maintained at 40°C or more during the addition of (b), terminating the addition of (b) when the pH of the mixed waste waters reaches from about 5.8 to about 8.5, and then recovering the precipitated beta aluminum hydroxide containing less than 60 wt. percent water from the mixed waste waters.

5. A method as claimed in claim 4, wherein the duration of the time period of said continuing addition of (b) to reduce the pH of the mixed waste waters to from 5.8 to 8.5 is at least 2 hours.

6. A method as claimed in claim 4, in which the step of recovering the precipitated beta aluminum hydroxide comprises subjecting to centrifugal separation the mixed waste waters containing precipitated beta aluminum hydroxide to separate a cake containing the precipitated beta aluminum hydroxide, from the remainder of the water.

7. A method as claimed in claim 4, in which the scum is separated by a dissolved air flotation method.

8. A method as claimed in claim 4, in which the scum is dissolved in (b).

9. A method as claimed in claim 4, in which the scum contains from 1 to 3 wt. percent of aluminum.

* * * * *

UNITED STATES PATENT OFFICE
CERTIFICATE OF CORRECTION

Patent No. 3,890,226          Dated June 17, 1975

Inventor(s) Yuiti Hanam et al

It is certified that error appears in the above-identified patent and that said Letters Patent are hereby corrected as shown below:

On the cover sheet    item [30] should read as follows:

Japan       29828       March 14, 1973

Signed and Sealed this twenty-second Day of June 1976

[SEAL]

Attest:

RUTH C. MASON
*Attesting Officer*

C. MARSHALL DANN
*Commissioner of Patents and Trademarks*